Figure 3:
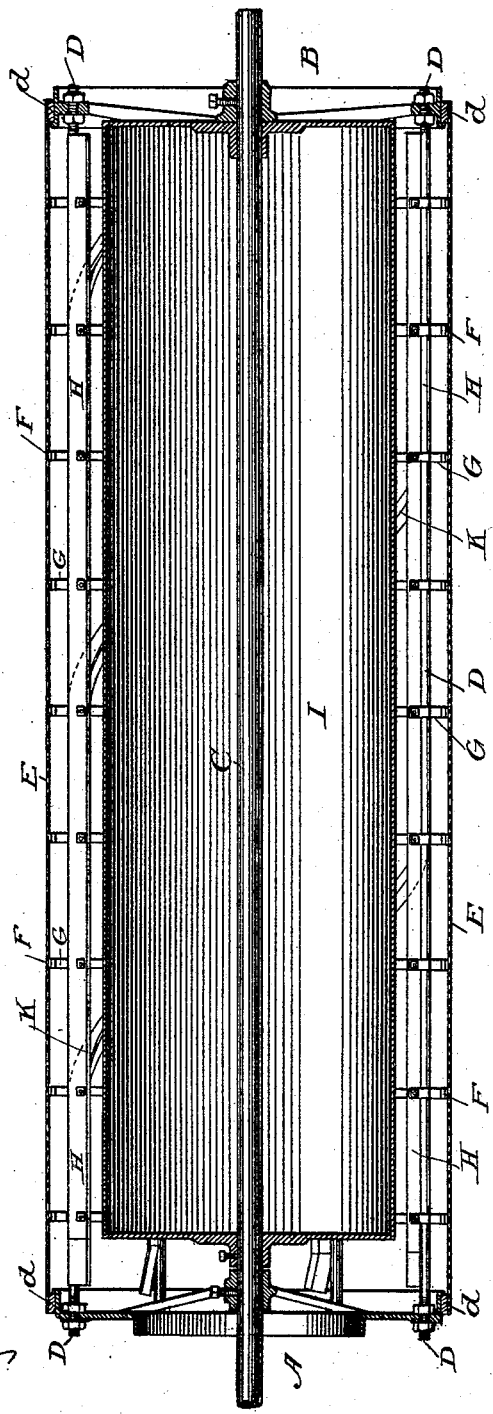

(No Model.) 2 Sheets—Sheet 1.
W. D. GRAY.
FLOUR BOLT.
No. 492,795. Patented Mar. 7, 1893.
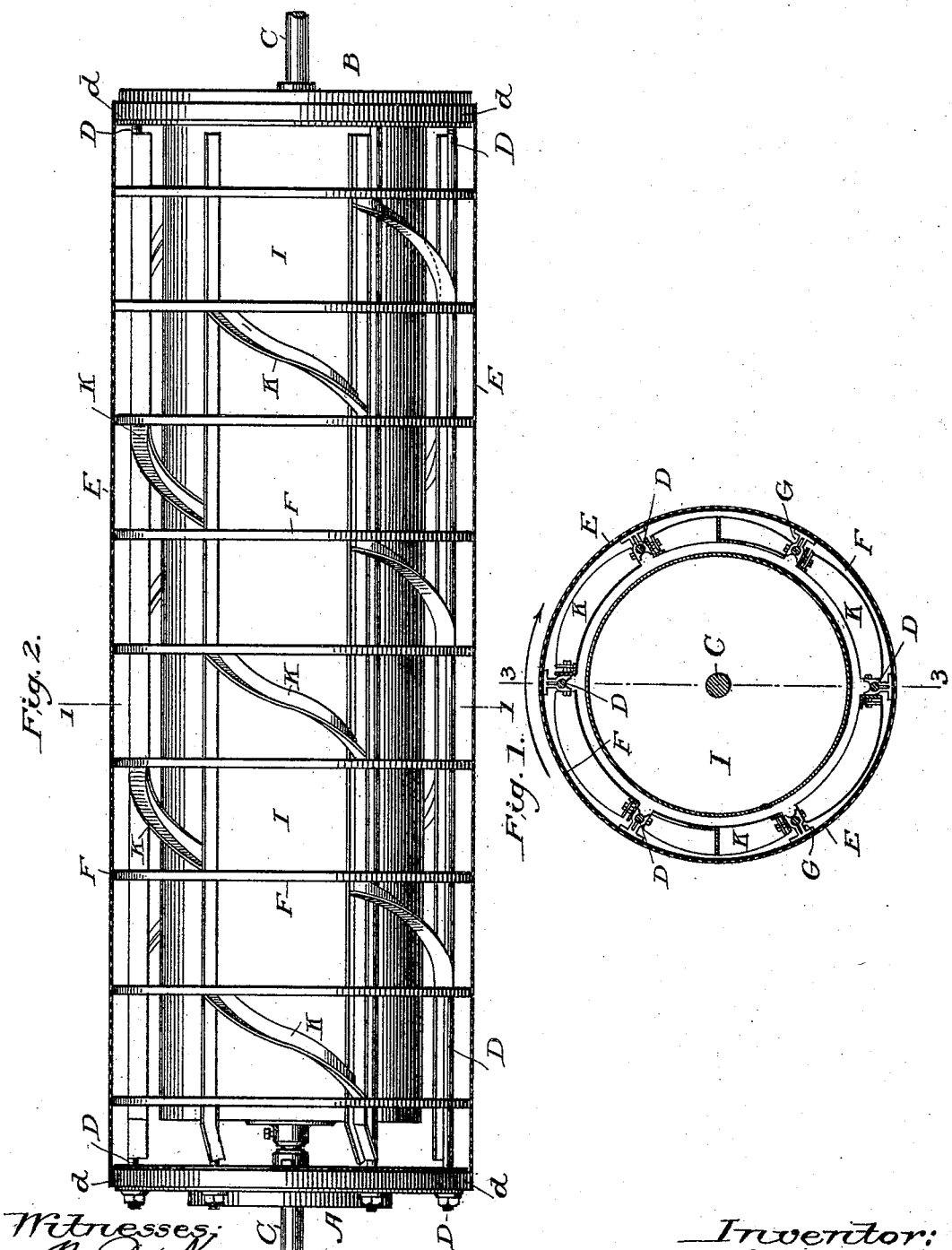
Witnesses:
Inventor:
W. D. Gray
By Phil T. Dodge
Atty (No Model.) 2 Sheets—Sheet 2.

W. D. GRAY.
FLOUR BOLT.

No. 492,795. Patented Mar. 7, 1893.

on line 3-3.

Witnesses:
W. R. Kennedy
F. J. Elmore

Inventor:
W. D. Gray
By Phil. T. Dodge
Atty

UNITED STATES PATENT OFFICE.

WILLIAM D. GRAY, OF MILWAUKEE, WISCONSIN, ASSIGNOR TO THE EDWARD P. ALLIS COMPANY, OF WISCONSIN.

FLOUR-BOLT.

SPECIFICATION forming part of Letters Patent No. 492,795, dated March 7, 1893.

Application filed November 23, 1891. Serial No. 412,829. (No model.)

*To all whom it may concern:*

Be it known that I, WILLIAM D. GRAY, of Milwaukee, county of Milwaukee, and State of Wisconsin, have invented a new and useful Improvement in Flour-Bolts, of which the following is a specification.

My invention relates to that class of flour dressers or bolts in which a centrifugal reel is combined with a central drum and intermediate longitudinal buckets or blades separated at their outer edges from the cloth so that they act to lift the material on the upgoing side of the reel and permit it to flow downward over the bolting cloth for the purpose of bringing into action a large portion of the bolting surface.

The object of the present invention is to increase the capacity and give greater uniformity in the bolting action of these machines, and to this end it consists essentially in combining with a reel having longitudinal lifting blades or buckets therein, obliquely arranged blades located between the buckets or lifter blades.

As my improved reel may be mounted and operated in machines which are in other respects of ordinary construction, I have deemed it sufficient to represent the reel alone herein.

In the accompanying drawings,—Figure 1 represents a cross-section of the reel on the line 1—1 of Fig. 2. Fig. 2 is a side elevation of the same. Fig. 3 is a longitudinal central cross-section of the same on the line 3—3 of Fig. 1.

The reel-frame as represented, consists of two annular spiders or heads A and B, fixed on a central shaft C, and connected by longitudinal rods D, which are extended through them and secured by nuts.

E represents the bolting-cloth, extending from one end of the reel to the other and attached at its extremities to wooden hoops *d*, encircling the respective heads A B. This cloth is sustained, as usual, at intermediate points in its length by thin internal hoops F, sustained by blocks G, mounted on and sustained by the longitudinal rods D. These blocks serve also to support a series of longitudinal lifting blades or buckets H, bolted thereto. These blades are preferably made of sheet metal of angular form in cross-section as shown in the drawings with their outer edges slightly separated from the bolting-cloth, but they may be of any suitable form provided they are adapted to lift and spread the material on the upgoing side of the reel.

I represents the central drum mounted within the reel and sustained from the central shaft or otherwise supported. It is preferably made of imperforate material, and inclosed at one or both ends.

So far as described the reel is of a construction heretofore patented to me, and is not claimed as of the present invention.

In applying the present improvement I introduce between the drum and the bolting-cloth a series of short spiral or obliquely arranged blades K. These blades lie between the lifter blades or buckets with their outer edges separated from the bolting-cloth, and their inner edges preferably but not necessarily separated from the drum. They may be sustained in position in any suitable manner, but the preferred construction is to rivet or bolt their ends to the longitudinal lifting buckets H, as represented in the drawings. I find that the best results are obtained when these spiral blades are made of comparatively short length and arranged in discontinuous order, so that instead of standing in a continuous spiral line or series they are separated from each other, or arranged in broken ranks, as plainly represented in Fig. 2. They are preferably made of angular form in cross-section like the lifting buckets in order that they may act the more effectively and assist in lifting the material and urging the same endwise through the reel. They are so arranged that they present on the upgoing side of the reel an inclination downward toward the tail end, so that as they act with lifting effect on the material they tend also to carry the latter toward the tail.

In practice I find that this series of intermediate blades used in connection with the lifting buckets or blades acts efficiently in spreading the material repeatedly over the cloth, and over an increased portion of the cloth, so that the bolting capacity of the reel is increased, and also that they serve to carry the material longitudinally through the reel at a greater speed than is practicable in their absence.

The best results are obtained when the central drum I is employed, but it is to be understood that this is not a necessary feature of the combination, and that the intermediate blades are of advantage when used in connection with the lifting blades H, and the reel. It is also to be understood that the existence of a space between the drum and the inner edges of the blades H and K, is not an essential requirement.

The blades K are found to act to the best advantage when constructed, as shown in the drawings, to approach the bolting-cloth more closely at their middle than at their ends, but the distance between their outer edges and the cloth may be uniform throughout their length.

In order to increase the capacity and efficiency of the reel I prefer to terminate the internal drum at a short distance from the head of the reel, and to project the lifting-blades H, beyond the end of the drum toward the head of the reel, and to give these extended or overhanging ends an inclination forward in the direction of rotation, so that as they pick the material up from the bottom of the reel they tend to carry it tailward into the annular space between the drum and the bolting-cloth.

While I have described and illustrated a reel of true cylindrical form, it is to be understood that reels of slightly tapered or conical form to facilitate the delivery of the material endwise without inclining the axis, will fall within the scope of my invention; conical and cylindrical reels being well known equivalents in the present state of the art.

The reel may be provided with a uniform bolting-cloth from end to end, or with cloth graded in fineness from one end to the other, as commonly practiced in the art, according to the character of the material to be treated and the extent to which it is to be separated or graded.

Having thus described my invention, what I claim is—

1. The combination substantially as described of a horizontal bolting reel, interior longitudinal lifting buckets or blades carried thereby parallel to the axis and separated from the bolting cloth, and spirally arranged blades between the buckets, also separated from the bolting cloth.

2. A horizontal cylindrical bolting reel and an internal drum, in combination with interior lifting buckets or blades carried by the said reel and arranged in planes radial to the axis thereof and with open spaces between the said parts, and spiral blades between the lifting buckets also separated from the drum and bolting-cloth, substantially as shown and described.

3. In combination with the cylindrical reel, the internal obliquely arranged blades K, separated from the bolting cloth, the distance between them varying at different points in the length of the blades.

4. In combination with a reel and internal lifting blades or buckets extending lengthwise thereof, intermediate obliquely arranged blades of angular cross-section separated at their outer edges from the bolting surface.

In testimony whereof I hereunto set my hand, this 7th day of November, 1891, in the presence of two attesting witnesses,

WILLIAM D. GRAY.

Witnesses:
WM. BANNEN,
FRANK W. GREENLEAF.